(12) United States Patent
Yamagata et al.

(10) Patent No.: US 11,061,044 B2
(45) Date of Patent: Jul. 13, 2021

(54) PLUG PROCESSING DEVICE AND SPECIMEN TEST AUTOMATION SYSTEM INCLUDING SAME

(71) Applicant: Hitachi High-Tech Corporation, Tokyo (JP)

(72) Inventors: Toshiki Yamagata, Tokyo (JP); Shugo Okabe, Tokyo (JP); Katsuhiro Kambara, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 217 days.

(21) Appl. No.: 16/315,336

(22) PCT Filed: Jul. 13, 2017

(86) PCT No.: PCT/JP2017/025557
§ 371 (c)(1),
(2) Date: Jan. 4, 2019

(87) PCT Pub. No.: WO2018/025608
PCT Pub. Date: Feb. 8, 2018

(65) Prior Publication Data
US 2019/0310276 A1    Oct. 10, 2019

(30) Foreign Application Priority Data

Aug. 3, 2016  (JP) .............................. JP2016-152788

(51) Int. Cl.
*G01N 35/04* (2006.01)
*B01L 3/00* (2006.01)
*G01N 35/02* (2006.01)

(52) U.S. Cl.
CPC .............. *G01N 35/04* (2013.01); *B01L 3/523* (2013.01); *G01N 35/02* (2013.01);
(Continued)

(58) Field of Classification Search
CPC .................. G01N 35/04; G01N 35/02; G01N 2035/0405; G01N 2035/0406; B01L 3/523; B01L 2300/042; A61J 9/085
See application file for complete search history.

(56) References Cited

U.S. PATENT DOCUMENTS

2007/0098597 A1    5/2007  Brunner
2012/0318076 A1*  12/2012  Kappelhoff ........ G01N 35/0099
                                                   73/864.11
(Continued)

FOREIGN PATENT DOCUMENTS

EP    0 973 039 A2    1/2000
JP    2005-145540 A    6/2005
(Continued)

OTHER PUBLICATIONS

International Search Report (PCT/ISA/210) issued in PCT Application No. PCT/JP2017/025557 dated Sep. 12, 2017 with English translation (four (4) pages).
(Continued)

*Primary Examiner* — Jill A Warden
*Assistant Examiner* — John McGuirk
(74) *Attorney, Agent, or Firm* — Crowell & Moring LLP

(57) ABSTRACT

Plug-closing processing units are provided with: a first plug chuck parts that grasp plugs; and a second plug chuck part located above the first plug chuck parts, wherein the first plug chuck parts each include at least two first supports that grasp the plugs from more than one direction, and the second plug chuck part is provided with a plug-closing mechanism that includes a second support disposed in the radial direction of plugs and having an inclined lower end surface. Thus, provided are a plug processing device capable of stable plug-opening processing and plug-closing processing on a (Continued)

conveyor line for a specimen container, and a specimen test automation system including the plug processing device.

10 Claims, 16 Drawing Sheets

(52) U.S. Cl.
CPC .................. *B01L 2300/042* (2013.01); *G01N 2035/0405* (2013.01); *G01N 2035/0406* (2013.01)

(56) References Cited

U.S. PATENT DOCUMENTS

| | | | |
|---|---|---|---|
| 2014/0174028 A1 | 6/2014 | Yamagata et al. | |
| 2016/0272348 A1* | 9/2016 | Itoh | B65B 7/2835 |

FOREIGN PATENT DOCUMENTS

| | | | |
|---|---|---|---|
| JP | 2005145540 A * | 6/2005 | |
| JP | 4414430 B2 | 2/2010 | |
| JP | 2013-61250 A | 4/2013 | |
| JP | 2015-17868 A | 1/2015 | |
| JP | 2015-040696 A | 3/2015 | |
| JP | 2015040696 A * | 3/2015 | |
| WO | WO 2013/002216 A1 | 1/2013 | |

OTHER PUBLICATIONS

Japanese-language Written Opinion (PCT/ISA/237) issued in PCT Application No. PCT/JP2017/025557 dated Sep. 12, 2017 (four (4) pages).
Extended European Search Report issued in European Application No. 17836715.7 dated Apr. 17, 2020 (eight (8) pages).
International Preliminary Report on Patentability (PCT/IB/338 & PCT/IB/373) issued in PCT Application No. PCT/JP2017/025557 dated Feb. 14, 2019, including English translation of document C2 (Japanese-language Written Opinion (PCT/ISA/237) previously filed on Jan. 4, 2019 (eight (8) pages).
Japanese-language Office Action issued in Japanese Application No. 2018-531809 dated Nov. 10, 2020 with English translation (eight (8) pages).

* cited by examiner

[FIG. 1]
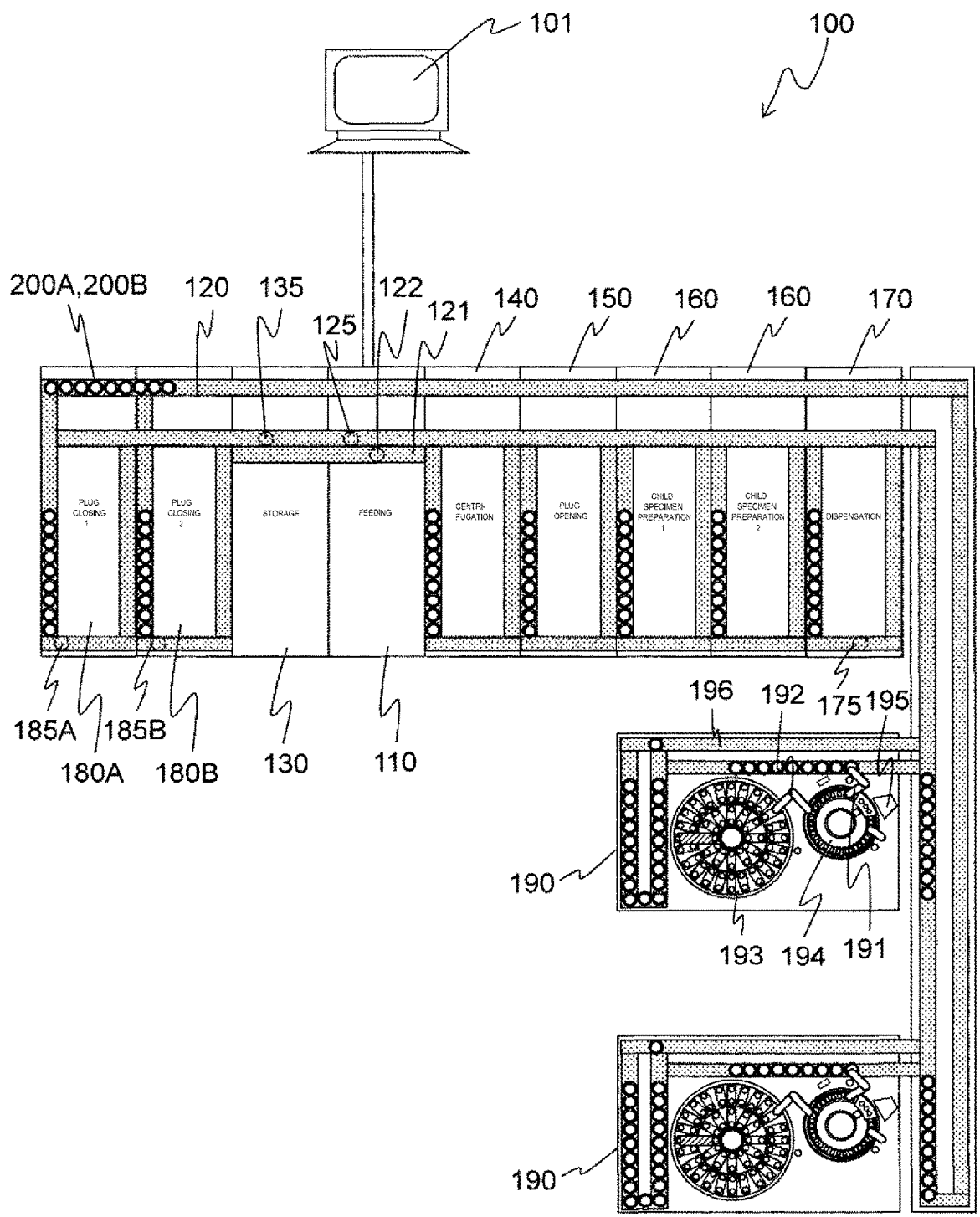

[FIG. 2]
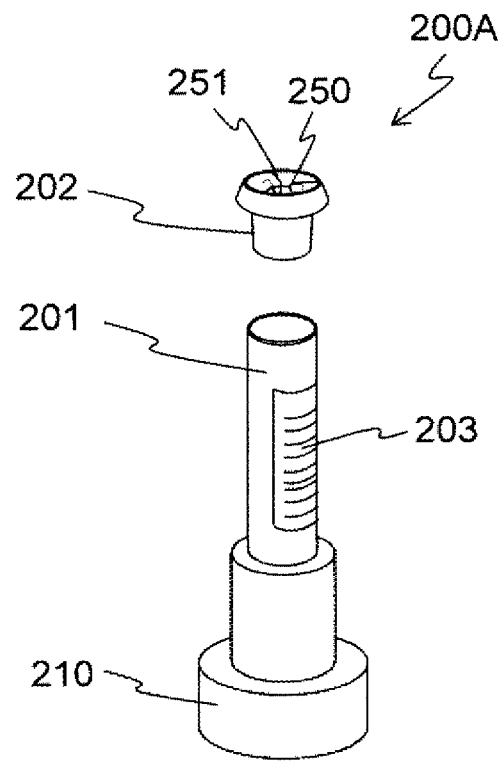
[FIG. 3]
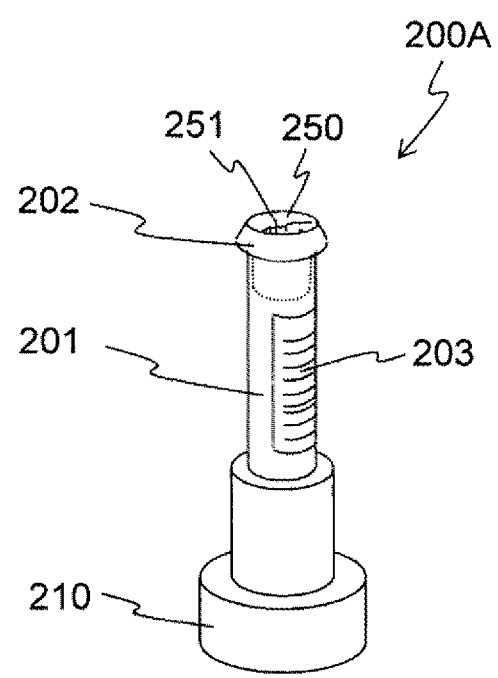

[FIG. 4]
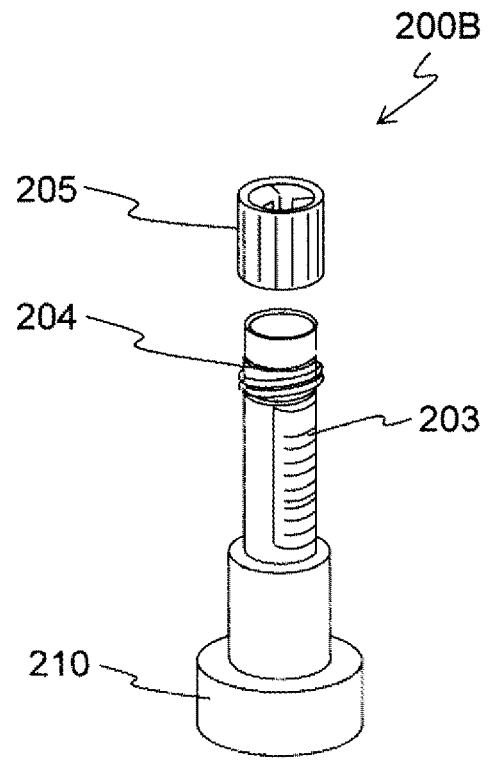
[FIG. 5]
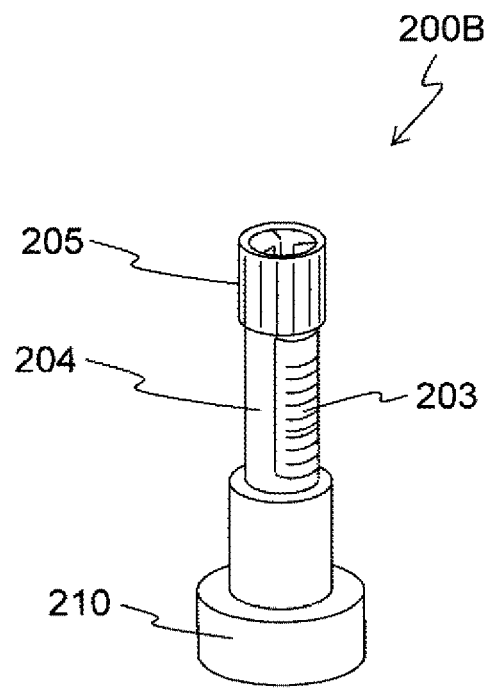

[FIG. 6]
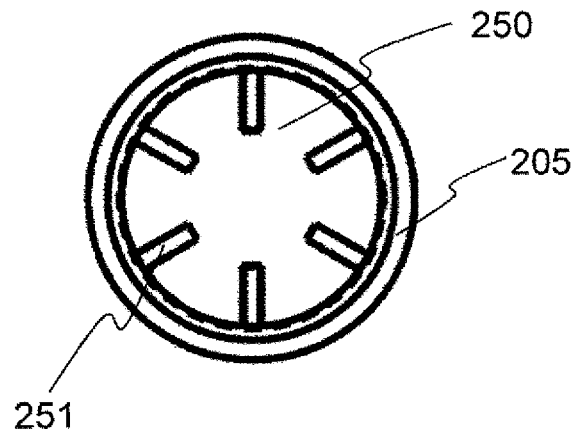
[FIG. 7]
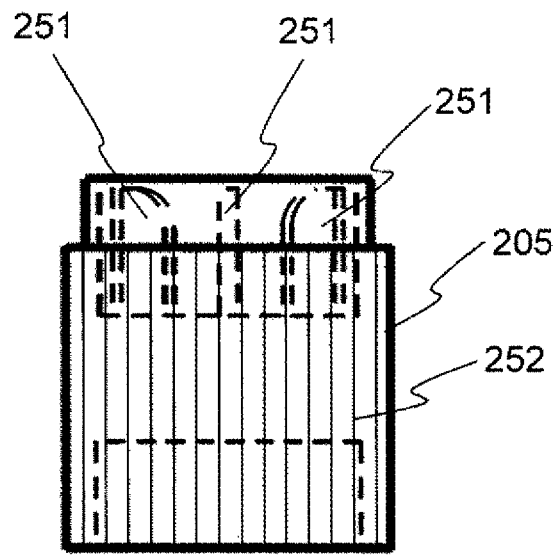

[FIG. 8]
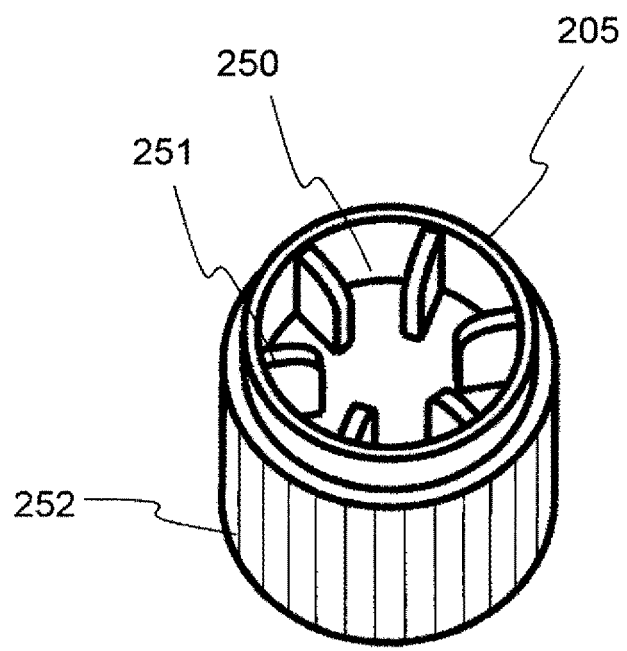

[FIG. 9]
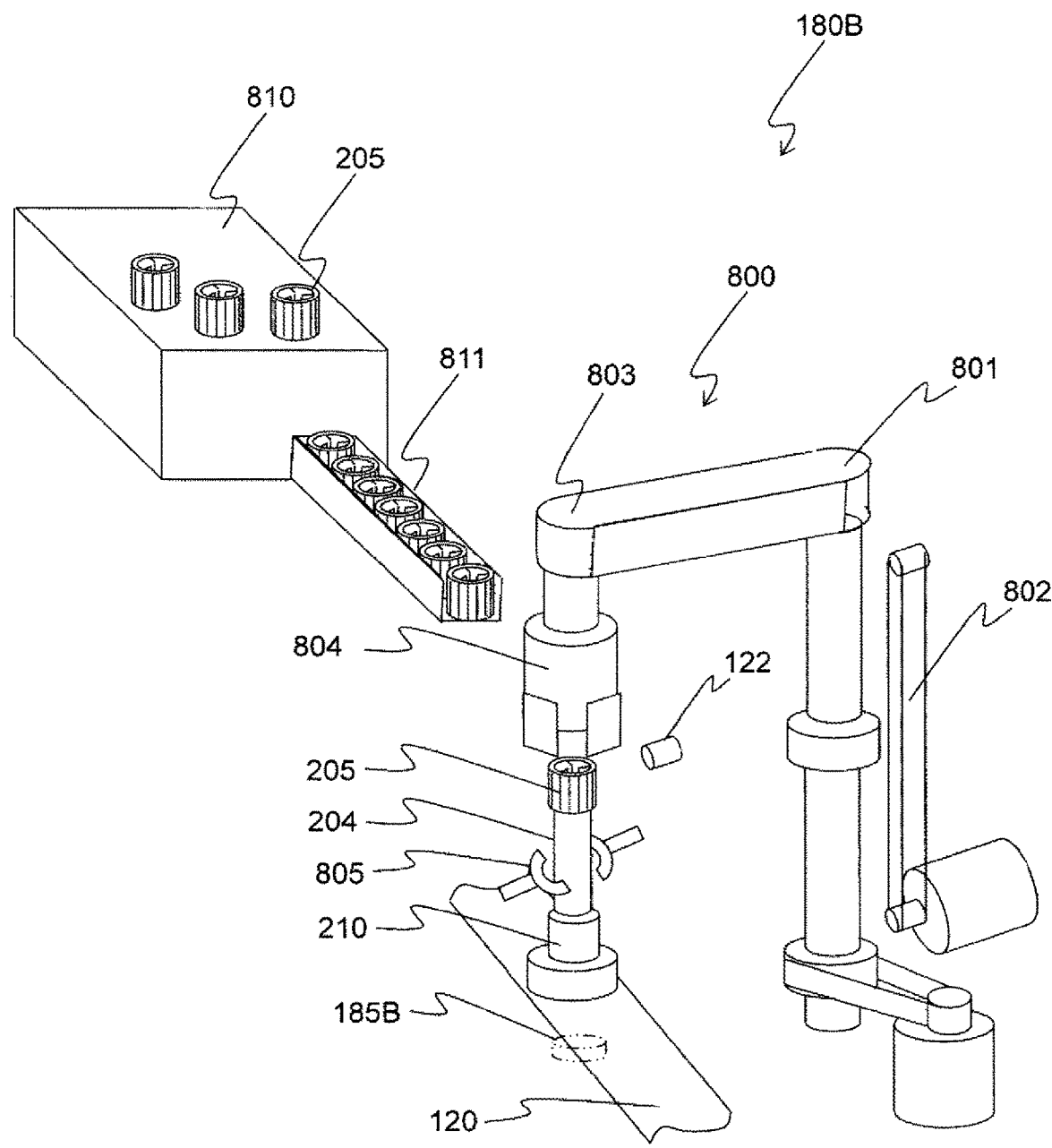

[FIG. 10]
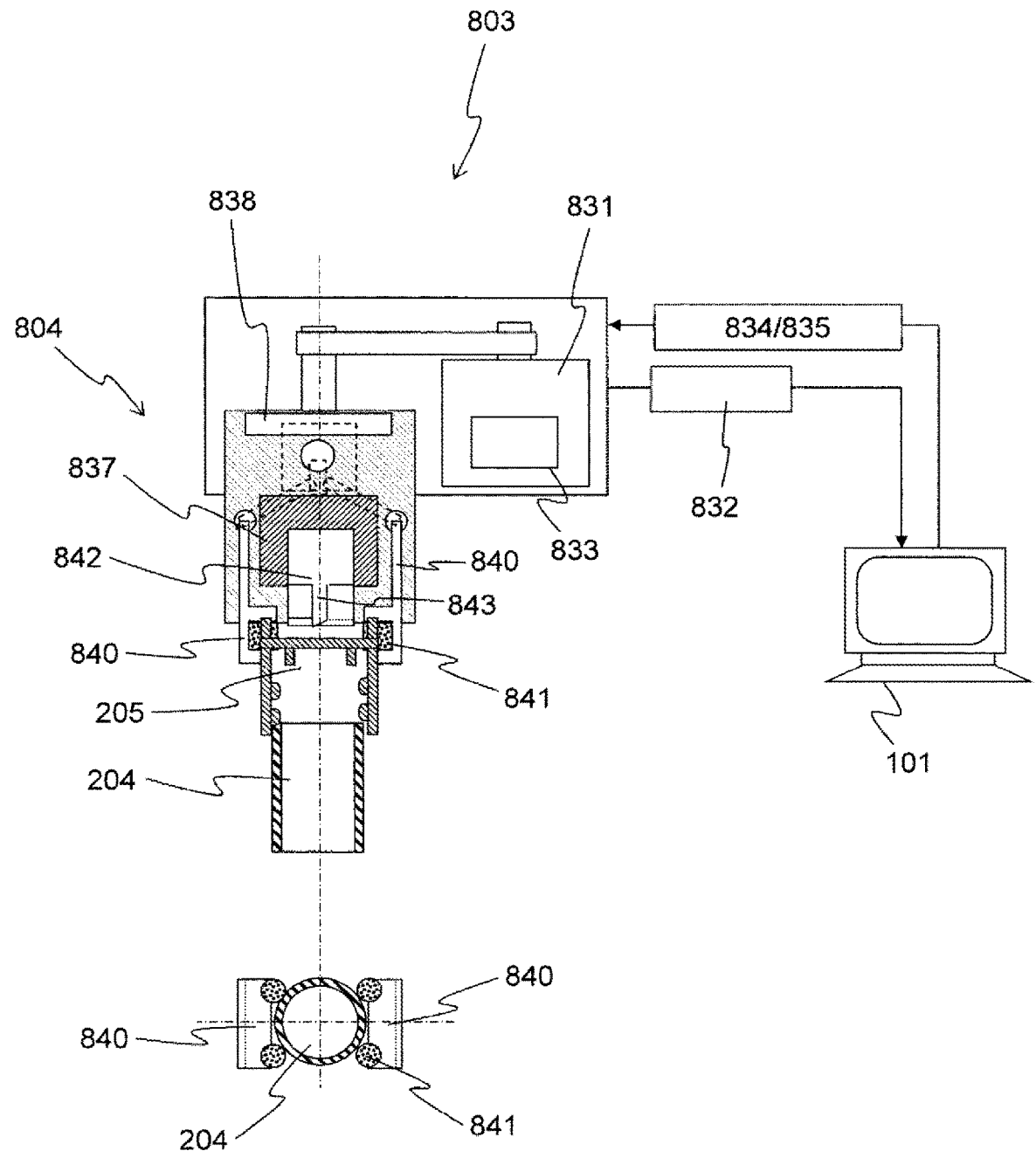

[FIG. 11]
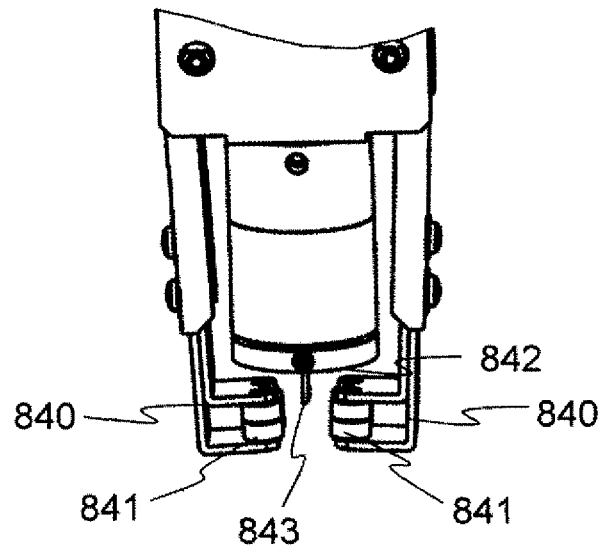
[FIG. 12]
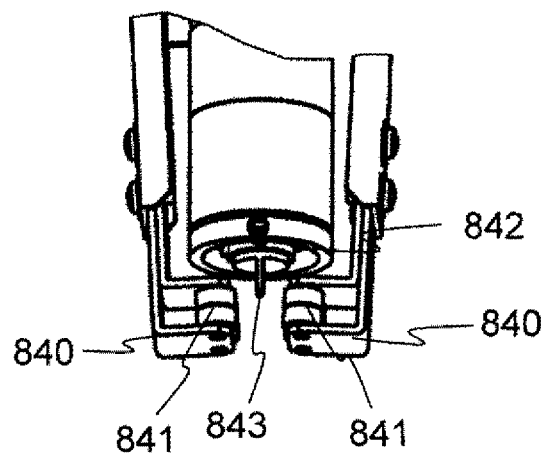

[FIG. 13]
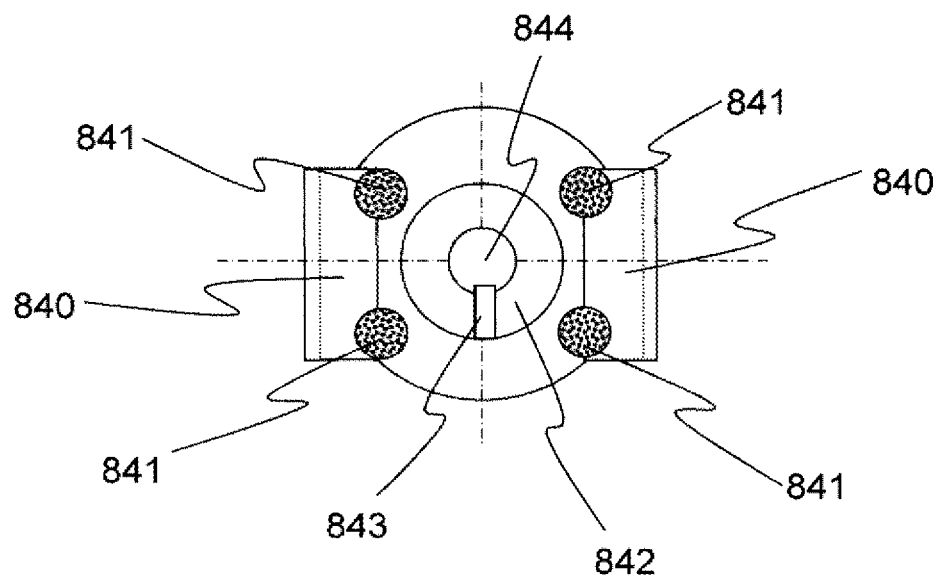
[FIG. 14]
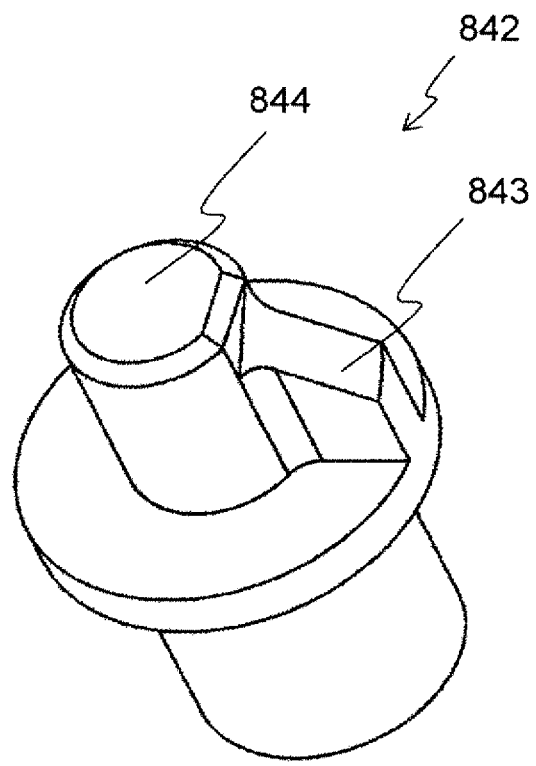

[FIG. 15]
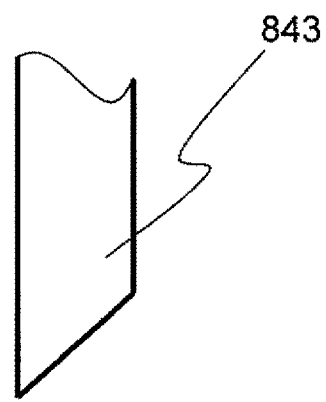
[FIG. 16]
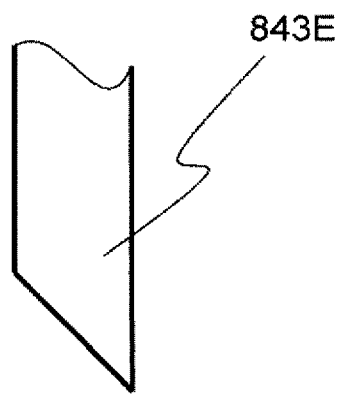

[FIG. 17]
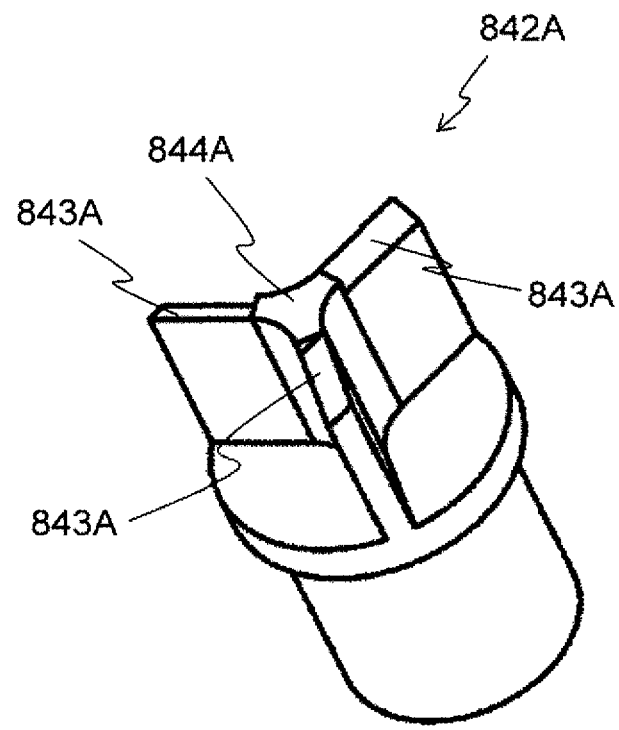
[FIG. 18]
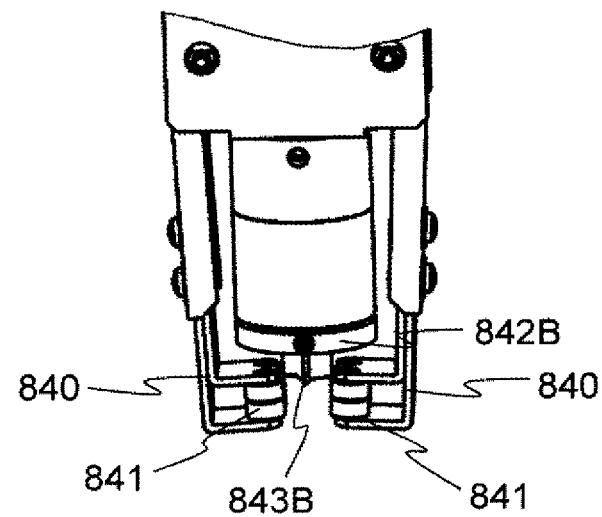

[FIG. 19]
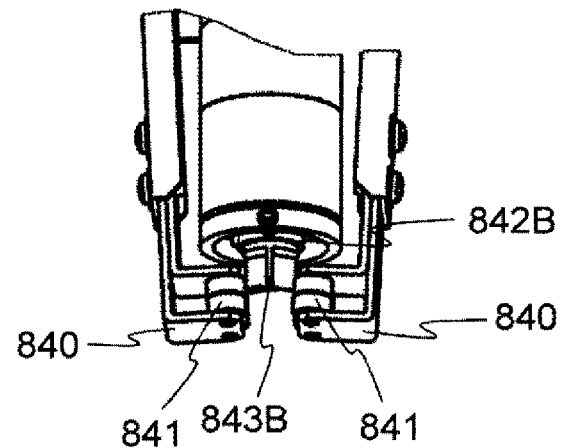
[FIG. 20]
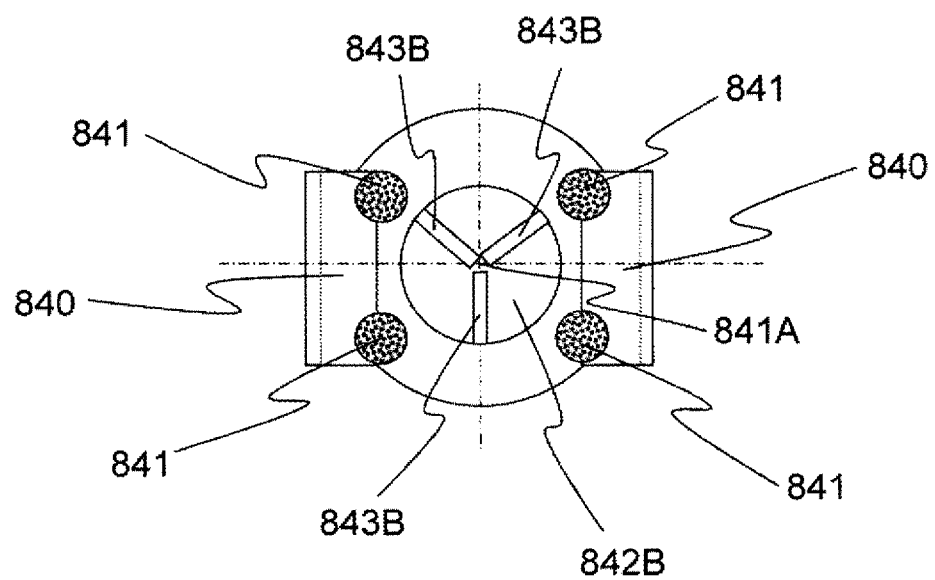

[FIG. 21]
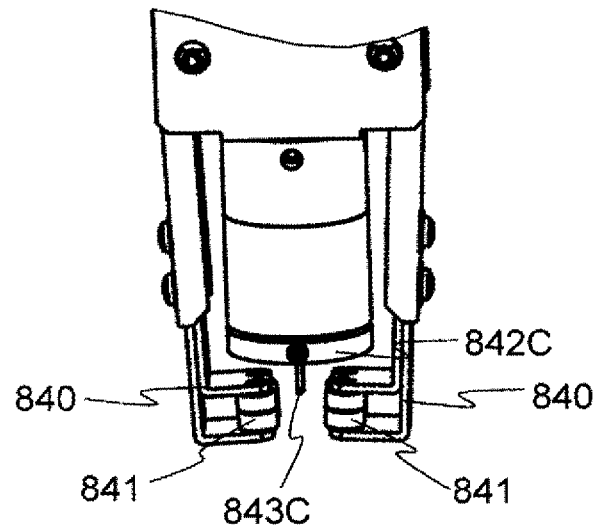
[FIG. 22]
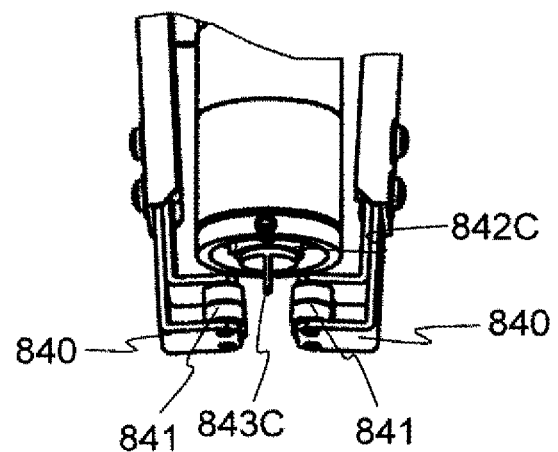

[FIG. 23]
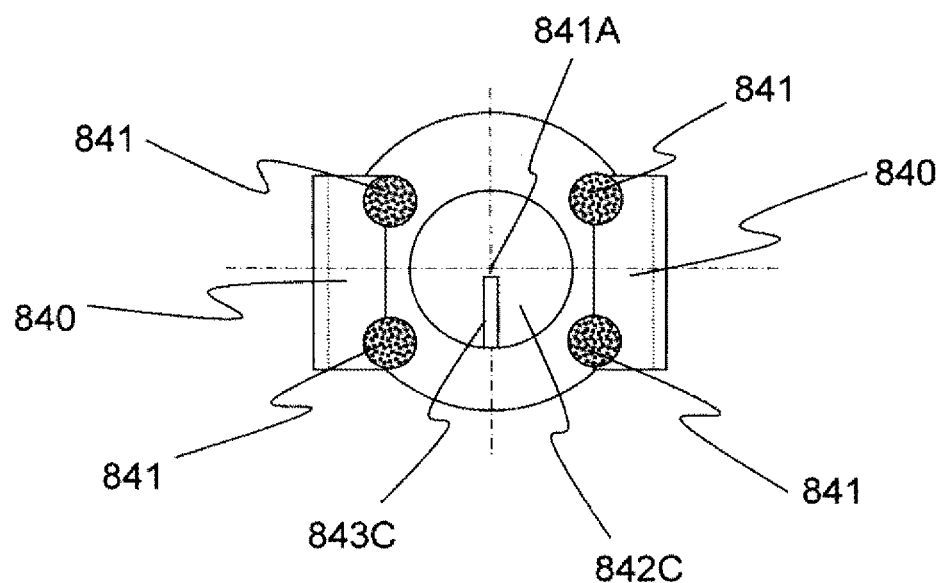
[FIG. 24]
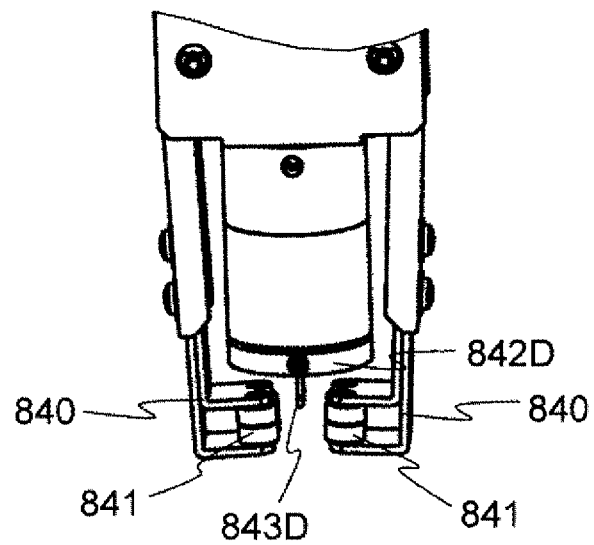

[FIG. 25]
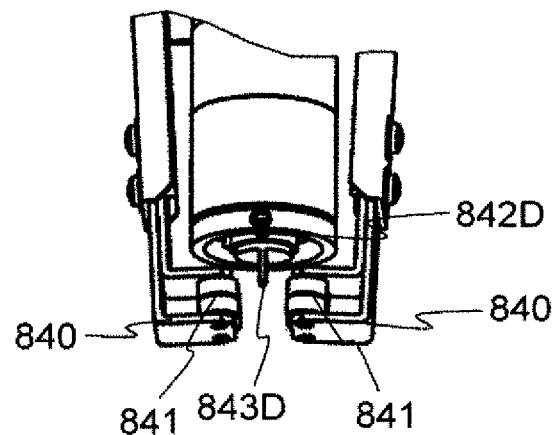
[FIG. 26]
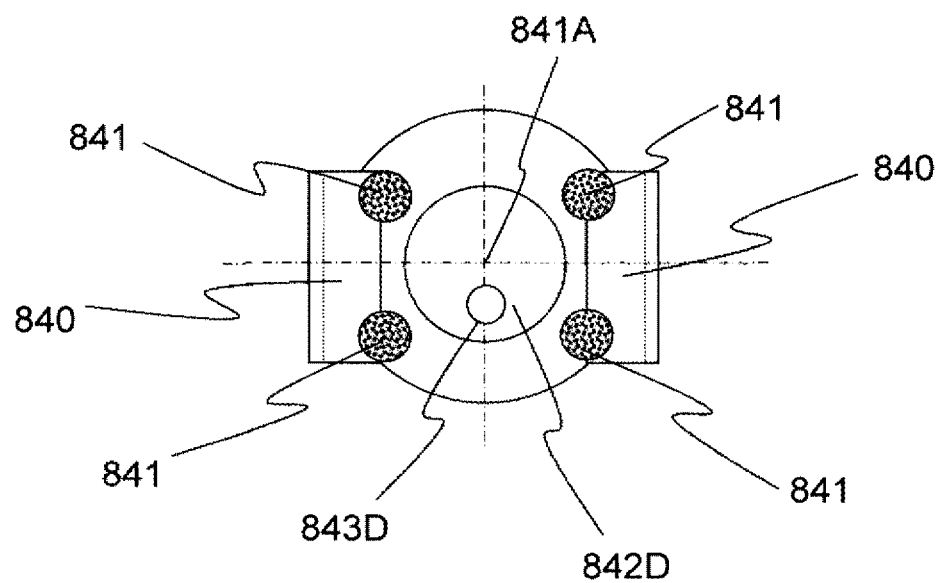

PLUG PROCESSING DEVICE AND SPECIMEN TEST AUTOMATION SYSTEM INCLUDING SAME

TECHNICAL FIELD

The present invention relates to a plug processing device suitably provided on a specimen test automation system used in preprocessing of a biological sample (hereinafter referred to as "specimen") such as blood and urine before feeding into an automatic analyzer configured to analyze the same, and relates to a specimen test automation system including the same.

BACKGROUND ART

Regarding a plug processing device for automatically opening and closing a reaction container, PTL1 describes an opening and closing device including: a holding device for non-rotatable holding of one or more reaction containers; a gripper for gripping of a lid for the reaction container, the gripper having gripping jaws for holding the lid; and a rotation mechanism for rotatable holding of the gripper, wherein the gripping jaws are arranged such that the lid is held by the gripping jaws through frictional contact when being inserted into an area between the gripping jaws, and the gripper has no active operating device for opening and closing the gripping jaws.

PTL 1 further discloses that the gripping jaws have, on gripping surfaces thereof, one or more cutting webs running at right-angles to the direction of rotation, and this cutting web has a sharp cutting edge which engages with a surface of the lid, thereby allowing the transmission of considerable torque from the gripper to the lid.

PRIOR ART LITERATURE

Patent Literature

PTL 1: Japanese Patent No. 4414430

SUMMARY OF INVENTION

Technical Problem

A specimen test automation system is, for example, a system configured to perform preprocessing of a specimen, which is to be sent to an automatic analyzer configured to analyze a sample to be measured (for example, a specimen, or a mixed solution of the specimen and a reagent) by measuring physical properties thereof. The specimen test automation system includes a processing unit configured to perform various processes such as container plug closing, centrifugation, plug opening, dispensation, stirring, and analysis.

As a technique of a plug-opening device and a plug-closing device configured to perform plug opening (hereinafter, referred to as "plug-opening processing") and plug closing (hereinafter, referred to as "plug-closing processing") of a specimen container or a reagent container in plug opening and plug closing of a container in such a specimen test automation system, there is, for example, the opening and closing device described in PTL 1.

However, in operation of plug-opening processing and plug-closing processing described in PTL 1, in which a screw cap is pressed in, a dedicated cup holder and a container holding mechanism are necessary.

Further, in order to grip such a plug through frictional contact, cuttings are generally provided on a surface of a gripping chuck in a case in which the gripping chuck is made of stainless steel and the like. In this case, periodic cleaning operation of a support of the gripping chuck surface is necessary, which requires time.

Meanwhile, a specimen test automation system is required to save labor via 24-hour operation, and a technique has been desired which is capable of further suppressing reduction in a throughput of the entire system due to such cleaning operation and consumable supplies.

In addition, in an existing plug-closing module, a dedicated container holding mechanism or container holder and a dedicated transport line are necessary in the case of plug-closing processing operation in which a press-fit plug is pressed in. In addition, since a certain amount of pressing force is necessary, there is a risk of damage of a mechanism part or increase in the frequency of maintenance, and thus a technique capable of further improving a throughput of test has been desired.

An object of the invention is to provide a plug processing device capable of performing stable plug-opening processing and plug-closing processing of a specimen container on a conveyor line, and a specimen test automation system including the same.

Solution to Problem

In order to solve the above problems, for example, a configuration described in Claims is adopted.

The invention includes a plurality of means for solving the problems, and an example thereof includes: a first plug chuck configured to grip a plug; and a second plug chuck positioned above the first plug chuck, wherein the first plug chuck includes at least two or more first supports configured to grip the plug from a plurality of directions, the second plug chuck includes a second support arranged in a radial direction of the plug, and the second support having an inclined lower end surface, and the second plug chuck is rotated so as to perform plug opening or plug closing of the plug with respect to a container.

Advantageous Effect

According to the invention, it is possible to perform stable plug-opening processing and plug-closing processing of a specimen container on a conveyor line. Problems, configurations, and effects other than those described above will be further clarified with the following description of embodiments.

BRIEF DESCRIPTION OF DRAWINGS

FIG. 1 is a schematic view showing an overall configuration of a specimen test automation system according to an embodiment of the invention.

FIG. 2 shows a specimen container according to the embodiment of the invention in a state mounted on a holder.

FIG. 3 shows a state in which the specimen container shown in FIG. 2 is plug-closed.

FIG. 4 shows a specimen container according to the embodiment of the invention in a state mounted on a holder.

FIG. 5 shows a state in which the specimen container shown in FIG. 4 is plug-closed.

FIG. 6 shows an example of a plug used in the specimen container shown in FIG. 4 when viewed from an upper surface side.

FIG. 7 shows an example of the plug used in the specimen container shown in FIG. 4 when viewed from a side surface side.

FIG. 8 shows a perspective view of the plug used in the specimen container shown in FIG. 4.

FIG. 9 is a schematic view of each mechanism of a plug processing device according to the embodiment of the invention.

FIG. 10 is a schematic view of the plug processing device according to the embodiment of the invention.

FIG. 11 is an external perspective view of an example of a first plug chuck and a second plug chuck according to the embodiment of the invention.

FIG. 12 is a side view of an example of the first plug chuck and the second plug chuck according to the embodiment of the invention.

FIG. 13 is a bottom view of an example of the first plug chuck and the second plug chuck according to the embodiment of the invention.

FIG. 14 is an example of a perspective view of the second plug chuck according to the embodiment of the invention.

FIG. 15 is a side view of a lower end surface of a second support of the second plug chuck according to the embodiment of the invention.

FIG. 16 is another example of the side view of the lower end surface of the second support of the second plug chuck according to the embodiment of the invention.

FIG. 17 is another example of the perspective view of the second plug chuck according to the embodiment of the invention.

FIG. 18 is an external perspective view of another example of the first plug chuck and the second plug chuck according to the embodiment of the invention.

FIG. 19 is a side view of another example of the first plug chuck and the second plug chuck according to the embodiment of the invention.

FIG. 20 is a bottom view of another example of the first plug chuck and the second plug chuck according to the embodiment of the invention.

FIG. 21 is an external perspective view of still another example of the first plug chuck and the second plug chuck according to the embodiment of the invention.

FIG. 22 is a side view of still another example of the first plug chuck and the second plug chuck according to the embodiment of the invention.

FIG. 23 is a bottom view of still another example of the first plug chuck and the second plug chuck according to the embodiment of the invention.

FIG. 24 is an external perspective view of still another example of the first plug chuck and the second plug chuck according to the embodiment of the invention.

FIG. 25 is a side view of still another example of the first plug chuck and the second plug chuck according to the embodiment of the invention.

FIG. 26 is a bottom view of still another example of the first plug chuck and the second plug chuck according to the embodiment of the invention.

DESCRIPTION OF EMBODIMENTS

Figure 27A:
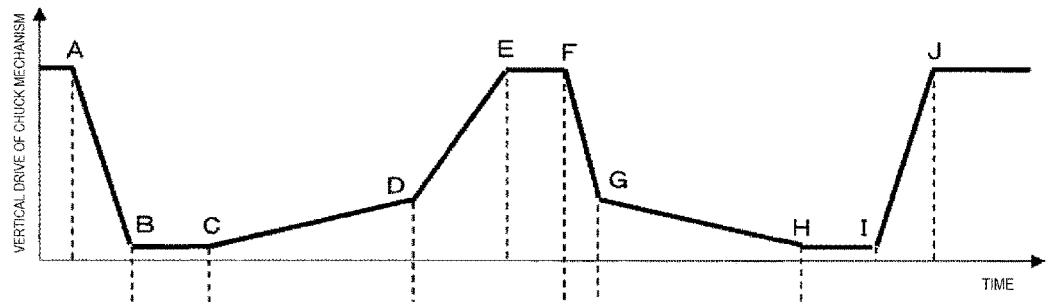
FIGS. 27A to 27C are operation pattern graphs of plug-closing processing of the specimen container according to the embodiment of the invention.

A preferred embodiment of a plug processing device and a specimen test automation system of the invention will be described with reference to FIGS. 1 to 27. FIGS. 1 to 27 illustrate, as an example, a case in which the plug processing device is used as a plug-closing processing unit configured to perform plug closing a container with a plug.

First, an example of a specimen test automation system including a plug processing device capable of performing plug-closing processing of a specimen container with a simple mechanism will be described with reference to FIG. 1. FIG. 1 shows an example of a configuration of the specimen test automation system according to the embodiment of the invention.

In FIG. 1, a specimen test automation system 100 according to this embodiment is a system configured to automatically analyze components of a specimen such as blood, urine, and the like. As shown in FIG. 1, main constituent elements of the specimen test automation system 100 include a specimen feeding unit 110, a specimen conveyance processing unit 120, a specimen storage unit 130, a centrifugation processing unit 140, a plug-opening processing unit 150, a child specimen container generation processing unit 160, a dispensation processing unit 170, plug-closing processing units 180A, 180B, an analysis processing unit 190, and a control computer 101.

The specimen feeding unit 110 is a unit for feeding specimen containers 200A, 200B containing a specimen into the specimen test automation system 100.

The specimen conveyance processing unit 120 is a mechanism configured to transport the specimen containers 200A, 200B fed from the specimen feeding unit 110 or a child container dispensed in the dispensation processing unit 170 to each unit in the specimen test automation system 100, such as the centrifugation processing unit 140, the dispensation processing unit 170, and the analysis processing unit 190.

Among the specimen conveyance processing unit 120, a specimen recognition unit 121, a plug detection unit 122, and a carrier recognition unit 125 are installed in the specimen feeding unit 110, and read a barcode 203 attached to the specimen containers 200A, 200B during conveyance, and obtain information for specifying the conveyed specimen containers 200A, 200B.

The specimen containers 200A, 200B may be recognized via a recording medium other than the barcode 203. For example, the specimen containers 200A, 200B may be provided with an RFID (Radio Frequency Identification) and the like, and the specimen recognition unit 121 may be configured to read specimen information (such as specimen ID) stored in the recording medium. The specimen recognition unit 121 may be an imaging device such as a CCD (Charge Coupled Device).

The plug detection unit 122 is an imaging device such as a CCD, which captures an image of the specimen containers 200A, 200B, analyzes the captured image, determines presence or absence of screwing with respect to plugs 202, 205 (see FIGS. 2 to 5) of the specimen containers 200A, 200B, and specifies a type of the plugs 202, 205.

The plug detection unit 122 may identify presence or absence of the plugs 202, 205 and the type of the plugs 202, 205 by a method other than detection of the plugs 202, 205 by image recognition. For example, the presence or absence of the plugs 202, 205 and the type of the plugs 202, 205 may be recognized by arranging a light emitting element and a light receiving element facing each other and detecting output of the light receiving element, and presence or absence of the plugs 202, 205 may be detected by other methods.

The carrier recognition unit 125 reads carrier ID information used to the carrier 210 in which the specimen containers 200A, 200B is erected. Carrier recognition units 135 ... 175, 185A, and 185B corresponding to the carrier recognition unit 125 are respectively provided on each unit in the specimen test automation system 100.

The centrifugation processing unit (processing unit) 140 is a unit for performing centrifugation with respect to the fed specimen containers 200A, 200B.

The plug-opening processing unit 150 is a unit for performing plug-opening processing of the plugs 202, 205 from the fed specimen containers 200A, 200B.

The child specimen container generation processing unit 160 is a unit for performing preparation necessary for dispensing the specimen contained in the fed specimen containers 200A, 200B in the following dispensation processing unit 170, for example, preparing new containers 201, 204, and attaching a barcode and the like to the prepared containers 201, 204.

The dispensation processing unit (processing unit) 170 is a unit for subdividing a centrifuged specimen or a non-centrifuged specimen into the new containers 201, 204 in order to analyze the specimen by the analysis processing unit 190 described below.

The plug-closing processing units 180A, 180B are units for performing plug-closing processing of the plugs 202, 205 with respect to the plug-opened specimen containers 200A, 200B or the subdivided specimen containers 200A, 200B, and include two plug-closing processing units 180A, 180B in accordance with the types of the plugs 202, 205 used for plug-closing of the specimen containers 200A, 200B. The plug-closing processing unit 180A has a structure suitable for using the plug 202 for press-fitting, and has, for example, a dedicated mechanism for the specimen conveyance processing unit 120 to press the plug 202. The plug-closing processing unit 180B has a structure suitable for using the screw plug 205. Each of the plug-closing processing units 180A, 180B includes a plug-closing mechanism 800 (see FIG. 9), which will be described in detail below.

The analysis processing unit 190 is a transport destination of the specimen processed in each processing unit of the specimen test automation system 100, and is a unit for performing qualitative and quantitative analysis of components of the specimen.

Main constituent elements of the analysis processing unit 190 include a specimen dispensation mechanism 191, a reagent dispensation mechanism 192, a reagent disk 193, a reaction disk 194, a detection mechanism 195, and a conveyor line 196 that is a part of the specimen conveyance processing unit 120.

The specimen dispensation mechanism 191 sucks and discharges the specimen in the specimen containers 200A, 200B. The reagent disk 193 stores a reagent necessary for component analysis of the specimen. The reagent dispensation mechanism 192 sucks and discharges the reagent.

The detection mechanism 195 measures optical properties of a mixture in a reaction cell of the reaction disk 194 and transfers obtained data to the control computer 101.

The specimen storage unit 130 is a unit configured to store the specimen containers 200A, 200B plug-closed by the plug-closing processing units 180A, 180B.

The control computer 101 controls operation of each unit in the specimen test automation system 100 and each mechanism in each unit, and also analyzes the measurement data in the analysis processing unit 190. Naturally, the control computer 101 can communicate with each above-described unit and mechanisms and each carrier recognition unit 125, 135 ... 185A, and 185B. In the control computer 101 of this embodiment, in particular, the specimen conveyance processing unit 120 is controlled so as to switch and convey the specimen containers 200A, 200B to appropriate plug-closing processing units 180A, 180B, in accordance with the type of the plugs 202, 205 used for plug-closing of the specimen containers 200A, 200B.

Next, a specimen analysis method performed by the analysis processing unit 190 will be described below. Basically, analysis is performed by controlling each element by the control computer 101.

First, the carrier 210 provided on the conveyor line 196 is conveyed by the control computer 101 to a position directly below a specimen dispensation probe of the specimen dispensation mechanism 191 in the analysis processing unit 190 with the specimen conveyance processing unit 120 and the conveyor line 196.

Next, a predetermined amount of the specimen contained in the specimen containers 200A, 200B provided on the carrier 210 is sucked by the specimen dispensation mechanism 191, and the specimen is discharged into a reaction cell disposed on the reaction disk 194.

Next, the reaction cell containing the sample is conveyed to a position directly below the reagent dispensation mechanism 192 by the reaction disk 194. Simultaneously, a predetermined reagent bottle is conveyed by the reagent disk 193 to a position directly below the reagent dispensation mechanism 192.

Next, a predetermined amount of the reagent contained in the reagent bottle is sucked by the reagent dispensation mechanism 192, and the reagent is discharged into the reaction cell containing the previously discharged specimen.

Next, the reaction cell containing the mixed solution of the reagent and the specimen is conveyed to a position of the stirring mechanism by the reaction disk 194, and the mixed solution of the reagent and the specimen contained in the reaction cell is stirred.

Next, the reaction cell containing the mixed solution of the reagent and the specimen is conveyed by the reaction cell 194 to a position of the detection mechanism 195.

Next, the detection mechanism 195 irradiates the mixed solution with light, detects an absorbance of the mixed solution and change in an amount of scattered light, and calculates a concentration of predetermined components in the specimen from detected information of the absorbance and information of the change in the light amount.

Next, the structure of the specimen containers 200A, 200B to be fed into the specimen test automation system 100 will be described with reference to FIGS. 2 to 8. FIG. 2 schematically shows the specimen container 200A using the plug 202 for pressing fit, and FIG. 3 shows the specimen container 200A in a state mounted on the carrier 210. FIG. 4 schematically shows the specimen container 200B using the screw plug 205, and FIG. 5 shows the specimen container 200B in a state mounted on the carrier 210. FIG. 6 is a top view of the screw plug 205, FIG. 7 is a side view of the screw plug 205, and FIG. 8 is a perspective view of the screw plug 205.

First, the plugs 202, 205 in this embodiment are molded with rubber, plastic, and the like, and can prevent leakage of the specimen contained in the specimen containers 200A, 200B. The plug may be either of a screw type or only press-fitted.

The specimen containers 200A, 200B according to the invention refer to the containers 201, 204 in which the specimen as a measurement subject is sealed with the plugs 202, 205, and may be either erected in the carrier 210 as shown in FIGS. 2 and 3, or erected in a rack (not shown), as long as being transportable.

In the specimen container 200A as shown in FIGS. 2 and 3, for example, a collected specimen is placed in the dedicated container 201, and then sealed by being lidded with the plug 202, so as to prevent contamination of external substances. A plug 202 for press-fitting suitable for the type of the container 201 is attached to the container 201. The plug 202 is of a type made of an elastic material such as rubber, or of a type made of a hard material such as synthetic resin. Plug opening of the specimen container 200A is performed by the plug-opening processing unit 150, and plug closing thereof is performed by the plug-closing processing unit 180A.

As shown in FIGS. 2 and 3, the plug 202 for press-fitting is provided with one or more ribs 251 on an inner periphery of a recess 250 in a manner radially spaced from each other.

In the specimen container 200B as shown in FIGS. 4 and 5, for example, the new empty container 204 attached with the barcode 203 is lidded by the screw plug 205 in the child specimen container generation processing unit 160, so that the specimen subdivionally dispensed by the dispensation processing unit 170 is sealed. Plug-closing processing of the screw plug 205 to the container 204 is performed by the plug-closing processing unit 180B. Plug opening of the specimen container 200B is performed by the plug-opening processing unit 150.

As shown in FIGS. 6, 7, and 8, the plug 205 is a plug that can be opened or closed by screwing the plug 205 in a specific direction, and is generally molded by injection molding. In addition, one or more ribs 251 are provided on the recess 250 provided on an upper portion of the plug 205. Further, a plurality of anti-slip grooves 252 are provided on an outer peripheral surface of the plug 205, so as to be easily opened and closed by an operator.

An information medium such as the barcode 203 is attached to the outer peripheral surface of the above-described container 201 or container 204. Other than the barcode 203, a two-dimensional code, an RFID, and the like may be attached as well. The container 201 and the container 204 are erected in the dedicated carrier 210 such as a holder and a rack, and are moved by the specimen conveyance processing unit 120 in the specimen test automation system 100.

Next, the structure of the plug-closing mechanism 800 provided on the plug-closing processing units 180A, 180B will be described referring to FIGS. 9 and 10. FIG. 9 shows a structure of the plug-closing mechanism provided on the plug-closing processing unit 180B suitable for plug-closing the plug 205, and FIG. 10 is a schematic cross-sectional view of a plug chuck rotation mechanism 803 and a plug chuck mechanism 804. The plug-closing mechanism provided on the plug-closing processing unit 180A suitable for closing the plug 202 has substantially the same configuration.

As shown in FIG. 9, the plug-closing processing unit 180B includes the plug-closing mechanism 800, a plug supply mechanism 810, and the plug detection unit 122.

The plug detection unit 122 in the plug-closing processing units 180A, 180B in FIG. 9 is provided in the vicinity of a specimen container clamping mechanism 805 of the plug-closing mechanism 800. The plug detection unit 122 images the specimen containers 200A, 200B before the plug-closing processing, so as to determine the type of the plugs 202, 205 to be used in accordance with information from the control computer 101, and to instruct the plug-closing mechanism 800 of an optimal plug-closing method. Then, when the plug-closing processing is completed, the plug detection unit 122 checks attachment state of the plugs 202, 205 of the specimen containers 200A, 200B again, so as to determine whether or not the plug-closing processing is performed appropriately.

When the system includes a plurality of plug-closing processing units 180A, 180B as shown in FIG. 1, it is conceivable to provide plug detection units 122 in front of specimen conveyance processing units 120 conveyed to each of the plug-closing processing units 180A, 180B. In this case, the specimen containers 200A, 200B can be conveyed to one of the plug-closing processing units 180A, 180B which can most efficiently perform the plug-closing processing in accordance with the type of the plugs 202, 205.

The plug-closing mechanism 800 is provided on the specimen conveyance processing unit 120 in the plug-closing processing unit 180B, and main components thereof include a plug movement mechanism 801, a plug-closing raising/lowering mechanism 802, the plug chuck rotation mechanism 803, the plug chuck mechanism 804, and the specimen container clamping mechanism 805.

The plug movement mechanism 801 transports the plug 205 conveyed by a plug conveyance mechanism 811 of the plug supply mechanism 810 from the plug conveyance mechanism 811 to a position of the container 204. FIG. 9 discloses a method of rotationally moving the plug chuck mechanism 804 about a rotation shaft, but is not limited to the method. For example, a method including an X-Y axis and moving the plug chuck mechanism 804 along an X-Y axis direction may be used as well.

The specimen container clamping mechanism 805 fixes the specimen container 200B during the plug-closing processing of the plug 205.

The plug chuck mechanism 804 holds the plug 205 transported from the plug supply mechanism 810 until the plug 205 is used for the plug-closing processing. A waste site for the plug 205 can be disposed in the vicinity of the plug-closing mechanism 800, and if plug closing is not necessary, the plug 205 can be discarded.

As shown in FIG. 10, the plug chuck mechanism 804 includes a set of first plug chuck parts 840 for gripping the plugs 202, 205, and a second plug chuck 842 positioned above the first plug chuck parts 840.

As shown in FIGS. 11, 12, and 13, each of the first plug chuck parts 840 includes two first supports 841 suitable for gripping the press-fit plug 202 or the screw plug 205 of various shapes. The first supports 841 are members configured to directly contact the plugs 202, 205, and are formed of rotating bodies such as bearings so as not to damage the plugs 202, 205.

The first plug chuck parts 840 are configured so that each of the first supports 841 can be rotated by a rotating motor 831 described below.

The first plug chuck parts 840 may be any one as long as the plugs 202, 205 can be gripped from a plurality of directions, and thus may be any one including two or more first supports 841, and may include three or more first supports 841. Further, if the plugs 202, 205 can be gripped from a plurality of directions by two or more first supports 841, a number of the first plug chuck part 840 itself may be one. Further, the first supports 841 are not necessarily formed of rotating bodies such as bearings, and may be sliding bodies made of a material having a friction coefficient higher than that of the plugs 202, 205.

As shown in FIGS. 13 and 14, the second plug chuck part 842 includes: a second support 843 for rotating the plugs 202, 205 by interfering with the rib 251 in the recess 250 on the upper surface side of the plugs 202, 205 during plug-closing processing of the plugs 202, 205 via rotating operation of the rotating motor 831 described below, and a pressing surface 844 configured to contact an upper end surface of the plugs 202, 205.

The second support 843 is arranged in a radial direction of the plugs 202, 205 of the second plug chuck part 842. In addition, as shown in FIG. 15, in order to prevent damage and deformation of the plugs 202, 205 when load concentrates in a part in which the second support 843 and the plugs 202, 205 are in contact with each other in the plug-closing process, a lower end of the second support 843 is inclined in one direction with respect to a rotation direction.

The pressing surface 844 is located at a center of the lower surface side of the second plug chuck part 842, and has a cylindrical shape.

The second plug chuck part 842 is also configured so that each second support 843 can be rotated by the rotating motor 831 described below.

The first supports 841 of the first plug body chuck portions 840 and the second support 843 of the second plug body chuck portion 842 are made of, for example, a metal such as stainless steel, but may also be made of, for example, a resin such as polytetrafluoroethylene or a rubber such as urethane.

As shown in FIG. 16, inclination of the lower end surface of the second support 843E may be opposite to that in FIG. 15.

As shown in FIG. 17, a second plug chuck part 842A includes a cylindrical pressing surface 844A at a center, and includes a plurality of second supports 843A. The second supports 843A are provided radially from a center of gravity 841A of the first supports 841 of the first plug chuck parts 840, which is equal to a rotation center of the first supports 841, and all of the second supports 843A have the same inclination direction of a lower end surface.

As shown in FIGS. 18, 19, and 20, a second plug chuck part 842B may include three second supports 843B. The second supports 843B are provided radially from the center of gravity 841A of the first supports 841, which is equal to the rotation center thereof, and all of the second supports 843A have the same inclination direction of the lower end surface. Similarly to the second supports 843A, all of the second supports 843B have the same inclination direction of the lower end surface. Two or more second supports 843B may be provided at positions displaced to an outer side in a radial direction of the plugs 202, 205 from the center of gravity 841A of the first supports 841, which is equal to a central position of the plugs 202, 205.

As shown in FIGS. 21, 22, and 23, a second plug chuck part 842C may be provided with one second support 843C in a normal direction extending from the center of gravity 841A of the first supports 841. As shown in FIGS. 21 and 22, a lower end surface of the second support 843C is also inclined.

As shown in FIGS. 24, 25, and 26, a second plug chuck part 842D may be provided with one second support 843D. The second support 843D is provided at a position displaced from the center of gravity 841A of the first supports 841 in the radial direction of the plugs 202, 205, and is formed of a rod-shaped projection. As shown in FIGS. 24 and 25, a lower end surface of the second support 843D is also inclined in one direction.

Since the lower end surface of the second supports 843, 843A, 843B, 843C, 843D, and 843E is inclined in one direction, when the plug chuck mechanism 804 is lowered on the plug conveyance mechanism 811 so as to grip and transport the plug 205 conveyed by the plug conveyance mechanism 811 of the plug supply mechanism 810, during a period in which the second supports 843, 843A, 843B, 843C, 843D, and 843E of the plug chuck mechanism 804 are in contact with the rib 251 provided on the plug 205, a circumferential force can be applied to the plug chuck mechanism 804 and the plug 205 in one direction. Since the plug chuck mechanism 804 and the plug 205 can be rotated in one direction by the action of this force, damage to the plug chuck mechanism 804 and the plug 205 can be reduced. That is, a sliding clutch 837 (details will be described below) of the plug chuck mechanism 804 may be rotated in a state in which excitation of the rotating motor of the plug chuck mechanism 804 is input, and the rotating motor 831 may be rotated in a state in which excitation of the rotating motor 831 of the plug chuck mechanism 804 is released. The plug 205 may be rotated as well.

The positional relationship for combining the first supports 841 of the first plug chuck parts 840 and the second support 843 of the second plug chuck part 842 may be variable with respect to a direction in which the plugs 202, 205 is held.

That is, an opening amount of the first plug chuck parts 840 can be controlled variably, such that the plugs are lightly held directly after initiation of plug-closing operation so as to prevent deformation and damage of the plugs 202, 205, and the plugs 202, 205 are firmly held upon termination of plug-closing operation so as to securely perform plug closing of the plugs 202, 205. As a result, it is possible to flexibly handle with the difference in the outer diameter, the material, and the hardness of the plugs 202, 205, and it is possible to perform the plug-closing processing to any type of the plugs 202, 205 at a reduced possibility of failure.

Referring back to FIG. 10, the plug chuck rotation mechanism 803 is a mechanism for rotating the plugs 202, 205 gripped by the plug chuck mechanism 804. The plug chuck rotation mechanism 803 includes: the rotating motor (rotation mechanism) 831 configured to rotate the first supports 841 of the first plug chuck parts 840 and the second support 843 of the second plug chuck part 842; an ammeter 832 for detecting a driving current of the rotating motor 831; the sliding clutch 837 configured to control a torque applied to rotation of the first supports 841 and the second support 843; a force sensor 838 configured to detect the rotation torque; and an encoder 833 configured to record the rotation torque.

The plug chuck rotation mechanism 803 can be rotated by the rotating motor 831 in both a plug-opening direction and a plug-closing direction, and can be raised in the plug-opening direction and lowered in the plug-closing direction by the plug-closing raising/lowering mechanism 802 configured to raise and lower the plug chuck rotation mechanism 803.

Motor drive of the rotating motor 831 and a raising/lowering motor provided on the plug-closing raising/lowering mechanism 802 is controlled by the control computer 101.

In the plug chuck rotation mechanism 803, the motor driving current of the rotating motor 831 is detected by the ammeter 832, the detected motor driving current is input to the control computer 101, and the torque with the current value can be calculated by the control computer 101.

By counting pulses output due to rotation of the rotating motor 831 by the encoder 833, a rotation angle of the plug chuck rotation mechanism 803 can be calculated by the control computer 101.

Meanwhile, the control computer 101 is configured to output a command signal for controlling drive of the rotating motor 831, and is capable of outputting a torque command signal 834 for controlling a tightening torque of the plug 205 due to rotation of the plug chuck rotation mechanism 803 and a command signal 835 of a rotation angle and a rotation speed of the plug 205.

Referring back to FIG. 9, the carrier recognition unit 185B is provided below the plug-closing mechanism 800. The carrier recognition unit 185B reads the carrier ID information and the specimen ID information recorded on the recording medium of the carrier 210 with respect to the carrier 210 on which the specimen containers 200A, 200B transported to the plug-closing mechanism 800 are mounted.

The information for identifying the specimen containers 200A, 200B read by the specimen recognition unit 121 and the carrier ID information read by the carrier recognition unit 185B are sent to the control computer 101, and the control computer 101 links these two pieces of information to each other so as to configure unique information for specifying the specimen containers 200A, 200B in the specimen test automation system 100.

As shown in FIG. 9, the plug supply mechanism 810 is provided around the plug-closing mechanism 800, and stores a plurality of plugs 205 supplied from an operator. Further, the plug 205 is automatically conveyed and supplied to the plug-closing mechanism 800. The plug supply mechanism 810 is provided by the plug conveyance mechanism (actuator) 811 configured to automatically convey the plug 205.

The plug conveyance mechanism 811 is a mechanism configured to convey a plurality of plugs 205 held by the plug supply mechanism 810 to the plug-closing mechanism 800. A conveyance method using a part feeder as shown in FIG. 9, a belt conveyor method, a turntable method, a method of conveying in the air by a robot arm, and the like may be adopted to the plug conveyance mechanism 811.

Next, a flow of the plug-closing processing, the child specimen container generation processing, and the specimen dispensation processing of the container 201 and the container 204 will be described with reference to FIGS. 1 to 9.

When fed into the specimen feeding unit 110 by the operator, the specimen containers 200A, 200B containing the specimen are automatically conveyed by the specimen conveyance processing unit 120 into the specimen test automation system 100.

Information of the specimen containers 200A, 200B conveyed to the specimen test automation system 100 is transmitted to the control computer 101 via a communication circuit inside the specimen test automation system 100. With a reply to this communication as a trigger, the specimen containers 200A, 200B are automatically conveyed to each of the processing units in the specimen test automation system 100 by the specimen conveyance processing unit 120.

The specimen recognition unit 121 reads the fed barcode 203 and transmits the same to the control computer 101. The carrier recognition unit 125 reads the carrier ID information of the used carrier 210 and transmits the same to the control computer 101. Further, the plug detection unit 122 analyzes the image of the specimen containers 200A, 200B, so as to determine presence or absence of screwing with respect to the plugs 202, 205 of the specimen containers 200A, 200B and to specify the type of the plug 202, and transmits a result to the control computer 101.

The control computer 101 correlates these pieces of information so as to configure unique information indicating the specimen containers 200A, 200B in the specimen test automation system 100.

The control computer 101 determines content of processing to the specimen containers 200A, 200B (child specimen container generation processing, dispensation processing, operation parameters of each mechanism part, and the like) based on the analysis information, and uses the content of processing as processing information so as to instruct the specimen conveyance processing unit 120 and each of the mechanisms and the processing units.

For example, in the child specimen container generation processing unit 160, the child specimen containers 201, 204 corresponding to the content of the dispensation processing are supplied, generated in a state attached with the barcode 203, and erected in the carrier 210. The carrier 210 in which the container 204 is erected is transported to the dispensation processing unit 170 by the specimen conveyance processing unit 120.

In the dispensation processing unit 170, the containers 201, 204 transported from the child specimen container generation processing unit 160 are subjected to subdivisional dispensation processing of the specimen from the specimen containers 200A, 200B transported from the specimen feeding unit 110.

When the dispensation processing is completed, the carrier ID of the carrier 210 on which the specimen containers 200A, 200B are mounted is read and sent to the control computer 101 by the carrier recognition unit 175 installed below the dispensation processing unit 170, and thus the carrier ID information is stored in the control computer 101 together with a piece of information "Subivisional processing has succeeded". Due to the above processing, information related to each of the specimen containers 200A, 200B is correlated in the control computer 101.

The control computer 101 inquires the transmitted carrier ID information with the carrier ID information transmitted at the time of child specimen generation, and specifies the specimen containers 200A, 200B. The control computer 101 determines necessity of plug-closing processing based on the inquired information and conveys the specimen containers 200A, 200B to an appropriate one of the plug-closing processing units 180A, 180B.

Here, the necessity of plug-closing processing includes processing information suitable for the specimen containers 200A, 200B, such as the type of the plug used in plug closing, the type of the used plug-closing processing unit 180A, 180B, and the operating parameters of each mechanism part of the plug-closing mechanism 800 (for example, a position where the plug chuck mechanism 804 grips the plug, and a rotation amount and a stop torque of the plug chuck rotation mechanism 803).

The carrier 210, on which the specimen containers 200A, 200B determined as needing plug-closing processing by the control computer 101 are mounted, is transported to the plug-closing processing unit 180A, 180B, and is subjected to plug-closing processing.

In the plug-closing processing units 180A, 180B, plug-opening processing of the plugs 202, 205 is performed with respect to the specimen containers 200A, 200B transported to the plug-closing mechanism 800.

When the plug-opening processing is completed, the carrier ID of the carrier 210 on which the specimen containers 200A, 200B are mounted is read by the carrier recognition unit 185A, 185B installed below the plug-closing mechanism 800, and a piece of information "Plug-closing processing has succeeded" is stored in the control computer 101 together with the carrier ID information. Due to the above processing, information related to each specimen container 200A, 200B is correlated in the control computer 101.

The specimen containers 200A, 200B of which the plug-closing processing is completed are conveyed to the specimen storage unit 130, and are subjected to specimen storage processing in the order of arrival. The specimen containers 200A, 200B are stored at a position instructed by the control computer 101. The carrier recognition unit 135 is also installed below the specimen storage unit 130, by which the carrier ID information is read and then transmitted to the control computer 101. The control computer 101 stores the carrier ID information together with a piece of information "Storage processing has succeeded" correlated therewith.

Next, plug-closing processing of the plugs 202, 205 performed by the plug chuck rotation mechanism 803 will be described with reference to FIGS. 1 to 27.

As described above, when the types of the specimen containers 200A, 200B and the plugs 202, 205 have been specified by the plug detection unit 122, the control computer 101 determines the content of the plug-closing processing of the specimen containers 200A, 200B based on the analysis information. The content of opening/closing processing may be previously registered by the operator.

In a case in which the type of the plug of the specimen container is the press-fit plug 202, it is transported to the plug-closing processing unit 180A in accordance with the instruction from the control computer 101. In a case in which the type of the plug of the specimen container is the screw plug 205, it is transported to the plug-closing processing unit 180B in accordance with the instruction from the control computer 101.

In the case of the press-fit plug 202, through operation of the plug-closing raising/lowering mechanism 802 and the plug chuck rotation mechanism 803, plug-closing processing is performed, in which the plug 202 is rotated and pressed in during plug closing. Meanwhile, in the case of the screw plug 205, in accordance with the instruction from the control computer 101, lowering operation is performed in accordance with a thread pitch while performing rotating operation at a rotational force, a rotation speed, and the like different from those of the case of the press-fitting plug 202.

In this way, in accordance with the information of the specimen containers 200A, 200B and the plugs 202, 205, optimal opening/closing processing can be achieved by switching the operating parameters such as the rotational force and the rotation speed during plug-closing operation.

Figure 27B:
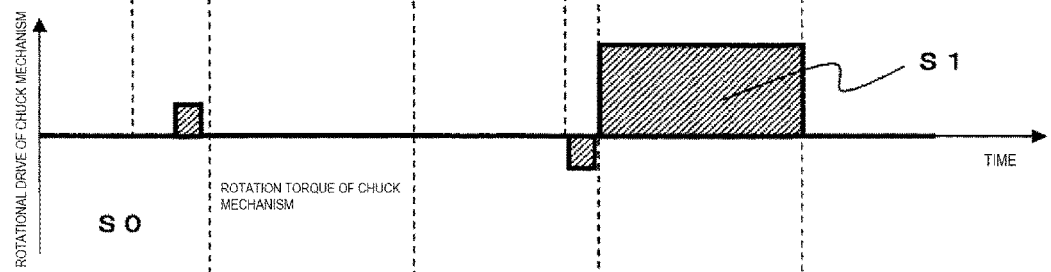
Figure 27C:
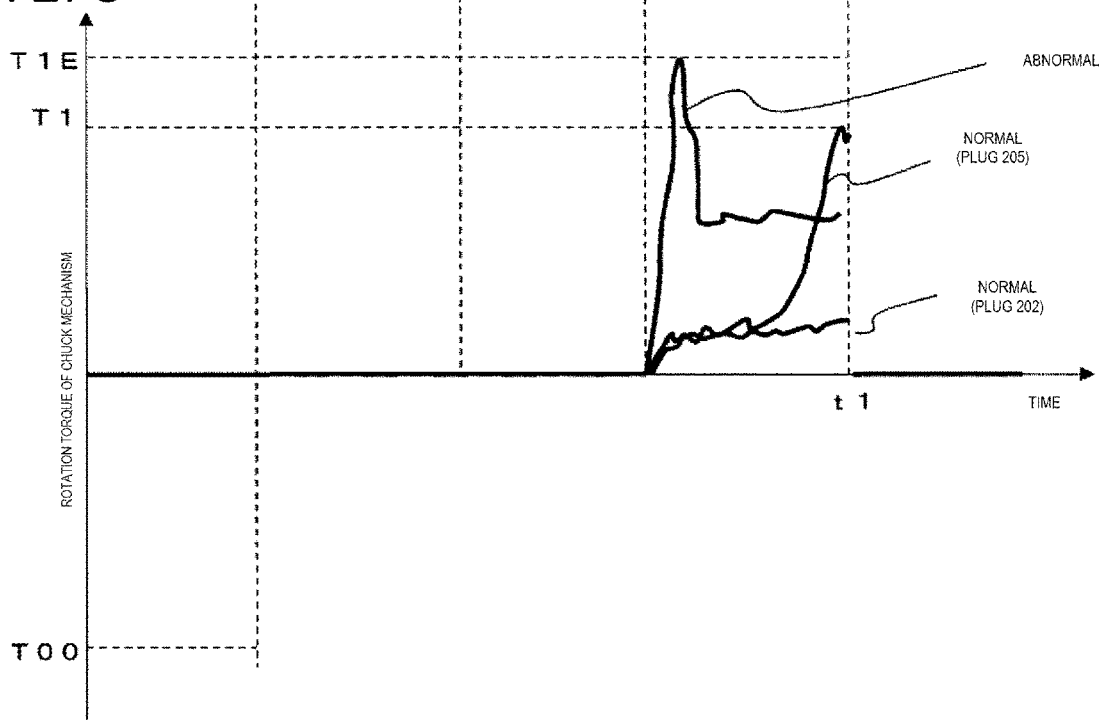

FIGS. 27(a) to 27(c) are examples of timing charts showing the flow of plug-closing processing focusing on raising/lowering operation of the plug-closing raising/lowering mechanism 802 and rotating operation of the plug chuck rotation mechanism 803 in the plug-closing mechanism 800.

FIG. 27(a) shows a driving height of the first plug chuck parts 840 due to the plug-closing raising/lowering mechanism 802; FIG. 27(b) shows the rotation speed of the plug chuck rotation mechanism 803 due to the rotating motor 831; and FIG. 27(c) shows the tightening torque of the plug chuck rotation mechanism 803, respectively.

First, as described above, the specimen containers 200A, 200B are conveyed by the specimen conveyance processing unit 120, and are stopped at a plug-closing position of the plug-closing mechanism 800. This stage corresponds to a period before A in the timing charts of FIG. 27.

(Processing A to C)

The plug chuck rotation mechanism 803 moves, and the plug supply mechanism 810 conveys the plug 205 with the plug conveyance mechanism 811, so as to start plug supply operation. Then, the plug chuck mechanism 804 is lowered (section A to B) by the plug-closing raising/lowering mechanism 802 to grip the plug 205 at a position C. At this time, positioning operation of the plug chuck rotation mechanism 803 may be performed. In FIG. 27(b), the plug chuck rotation mechanism 803 is rotated in a section B to C to perform positioning operation so as to return to the origin.

(Processing C to D)

When the plug chuck mechanism 804 grips the plug 205, the plug 205 is transported to the plug-closing position by the plug movement mechanism 801 in accordance with operation of the plug-closing raising/lowering mechanism 802.

(Processing D to E)

When plug transportation is completed, the plug chuck mechanism 804 is raised by the plug-closing raising/lowering mechanism 802, and stands by at the plug-closing position. During this time, the specimen container clamping mechanism 805 holds the conveyed specimen containers 200A, 200B on the specimen convey processing unit 120.

(Processing E to F)

The plug detection unit 122 determines that the plugs 202, 205 are not screwed to the specimen containers 200A, 200B, and receives input of instruction from the control computer 101.

(Processing F to G)

The plug chuck mechanism 804 is lowered by the plug-closing raising/lowering mechanism 802 in a state in which the plug 205 is held. At this time, positioning operation of the plug chuck rotation mechanism 803 may be performed.

(Processing G to H)

The plug chuck rotation mechanism 803 is rotated, and the first plug chuck parts 840 and the second plug chuck part 842 are rotated simultaneously with lowering operation of the plug-closing raising/lowering mechanism 802 in a state in which the plug 205 is held. Regarding the rotating operation of the plug chuck rotation mechanism 803, the torque command signal 834 from the control computer 101 and the command signal 835 of the rotation speed and the rotation angle are sent to the rotating motor 831. The first plug chuck parts 840 and the second plug chuck part 842 configured to grip the plug 205 are rotated due to drive of the rotating motor 831. Due to the drive of the rotating motor 831, the first plug chuck parts 840 and the second plug chuck part 842 start to rotate in a lowering and plug-closing direction from a time point G, and is stopped when reaching a command rotation angle S1 at a time point H. That is, the plug-closing processing is completed. Meanwhile, a maximum value of command torque is T1, which is a value sufficiently high so that actual rotation follows command rotation.

(Processing H to I)

The control computer 101 determines whether or not the plug-closing processing is normally performed based on the measured rotation torque. FIG. 27(c) shows examples of the rotation torque in an abnormal case and in a normal case. As described above, since the torque during the plug-closing processing of the plug 205 is detected by the force sensor 838, it is possible to detect occurrence of abnormality during the plug-closing processing and the plug-opening processing of the plug 205. For example, determination may be performed by previously determining a range of a normal torque value and determining that opening/closing processing abnormality has occurred when deviating from the range, or performed by storing a pattern of a torque waveform during normal opening/closing processing and determining opening/closing processing abnormality has occurred when a shape of a measured torque waveform obtained by the force sensor 838 is different from a shape of the normal torque waveform.

Although determination of the plug-closing processing has been described in this embodiment, determination of the plug-opening processing may be similarly performed in the section E to F in the plug-opening processing.

(Processing I to J)

When the plug-opening processing is completed, the first plug chuck parts 840 are raised and stand by until the next processing.

By performing the above processing, for example, from torque detection, load detection, and the like, it is possible to monitor plug-closing abnormality such as an incomplete plug-closing state in which the first plug chuck parts 840 obliquely grip the plug 205 and the plug 205 obliquely presses against the container 204.

A flow of the plug-closing processing of the press-fit plug 202 is also substantially the same. In the case of the press-fit plug 202, the plug-closing processing is performed with the rotation torque as shown in FIG. 27(c).

When incomplete opening/closing processing is detected, the operator may be notified. For example, in a case where a display device is provided on the control computer 101, the notification may be displayed on a screen, or an alarm or a display lamp may be turned on to call attention. In this case, the operator visually confirms the state of the specimen and performs recovery operation, such as eliminating abnormality if any. In addition, in a case of an incomplete plug-closing state, the plug-closing processing may be completely performed by transitioning to retry operation (opening and then re-closing when abnormality is detected), and it is possible to return to normal operation by performing such processing.

Next, processing performed when the plug-closing mechanism 800 grips the plugs 202, 205 will be described with reference to FIG. 10. First, processing of holding and plug-closing the plug 202 of the press-fit plug by the first plug chuck parts 840 will be described.

As described above, in the plug 202, one or more ribs 251 are provided on the inner periphery of the recess 250 in a manner radially spaced from each other. Therefore, when the first supports 841 of the first plug chuck parts 840 grip the plug 202, first, the second support 843 is fitted between the recess 250 and the rib 251 of the plug 202. Then, lowering operation is performed at a lowering amount instructed by the control computer 101, and the first supports 841 grip the plug 202 and the plug 202 is held.

As described above, when the first plug chuck parts 840 grip the plug 202, the second support 843 can be easily aligned with the central position of the plug 202, and the plug 202 can be gripped. Simultaneously, since the lower end surface of the second support 843 is inclined, in a case in which the second support 843 is in contact with the rib 251, the force can be released in one direction during vertical lowering. Therefore, it is possible to vertically grip the plug 202, and to prevent breakage of the rib 251 and the second support 843. Further, since the plug 202 is pressed by one or more sets of the first supports 841, it is possible to prevent the load in the circumferential direction from being unevenly applied to the plug 202 due to the gripping processing or the plug-closing process, and to prevent deformation and damage of the plug 202.

When press-fitting, similarly, the plug 202 is fixed by the second support 843 of the first plug chuck parts 840, and the rotational force of the rotating motor 831 is transmitted to the plug 202 by the first supports 841. Moreover, since the second support 843, which is provided on upper portions of the first supports 841, particularly the pressing surface 844 presses the plug 202 from above, it is possible to perform plug-closing processing while press-fitting from above.

Next, processing of gripping the plug 205 of the screw plug will be described.

When the first supports 841 of the first plug chuck parts 840 grip the plug 205, first, the second support 843 is fitted between the recess 250 and the rib 251 of the plug 205. Then, lowering operation is performed at a lowering amount instructed by the control computer 101, and the first supports 841 grip the plug 205 and the plug 205 is held.

As described above, when the first plug chuck parts 840 grip the plug 205, the second support 843 can be easily aligned with the central position of the plug 205, and the plug 205 can be gripped vertically. Further, since the plug 205 is pressed by one or more sets of the first supports 841, it is possible to prevent the load in the circumferential direction from being unevenly applied to the plug 205 due to the gripping processing or the plug-closing process, and to prevent deformation and damage of the plug 205. Furthermore, since the second support 843 is fitted in a groove between the ribs 251 on the upper surface of the plug 205 with respect to the plug 205, opening/closing processing of the plug 205 can be securely performed without slipping. Further, since the lower end surface of the second support 843 is inclined, in a case in which the second support 843 is in contact with the rib 251 when being fitted in, the force can be released in one direction during vertical lowering. Therefore, it is possible to vertically grip the plug 205, and to prevent breakage of the rib 251 and the second support 843.

Further, since the first plug chuck part 840 includes two or more first supports 841, it is possible to grip the plug 205 straight, and it is possible to suppress failure of the plug-closing processing due to inclination of the plug 205.

Next, effects of this embodiment will be described.

The specimen test automation system 100 according to the embodiment of the invention includes the plug-opening processing unit 150 configured to perform plug-opening of the plugs 202, 205 from the specimen containers 200A, 200B, the plug-closing processing units 180A, 180B configured to perform plug-closing of the specimen containers 200A, 200B with the plugs 202, 205, the units such as the centrifugation processing unit 140 and the dispensation processing unit 170 configured to process the specimen contained in the specimen containers 200A, 200B, the specimen conveyance processing unit 120 configured to convey the specimen containers 200A, 200B to each unit, and the control computer 101 configured to control each unit.

Each of the plug-closing processing units 180A, 180B includes the plug-closing mechanism 800. The plug-closing mechanism 800 include: the first plug chuck part 840 configured to grip the plugs 202, 205; and the second plug chuck parts 842, 842A, 842B, 842C, and 842D positioned above the first plug chuck part 840. The first plug chuck part 840 includes at least two or more first supports 841 configured to grip the plugs 202, 205 from a plurality of directions. The second plug chuck parts 842, 842A, 842B, 842C, 842D respectively include the second supports 843, 843A, 843B, 843C, 843D, and 843E arranged in the radial direction of the plugs 202, 205 and having an inclined lower end surface, and the second plug chuck parts 842, 842A, 842B, 842C, and 842D are configured to be rotated so as to perform plug opening or plug closing of the plugs 202, 205 with respect to the containers 200A, 200B.

In an existing plug processing device, a dedicated container holding mechanism or container holder and a dedicated transport line are necessary in the case of plug-closing processing operation in which a press-fit plug is pressed in. In addition, since a certain amount of pressing force is necessary, there is a risk of damage of a mechanism part or increase in the frequency of maintenance.

Further, in order to grip such plug through frictional contact, cuttings are generally provided on a surface of a gripping chuck when the gripping chuck is made of a metal such as stainless steel. In this case, periodic cleaning operation of a support of the gripping chuck surface requires time.

Meanwhile, since a specimen test automation system is required to save labor via 24-hour operation, there is a risk of reduction in the throughput of the entire system due to such cleaning operation and consumable supplies.

Regarding this, the plug-closing mechanism 800 provided on the plug-closing processing units 180A, 180B of the invention has a configuration combining the first supports 841 and the second support 843, which are shaped in consideration of features of each. Therefore, in a case of either the press-fitting plug 202 or the screw plug 205, deformation, damage, and slip of the plugs 202, 205 can be reduced as compared to the related art. Therefore, it is possible to securely perform gripping necessary for opening/closing as compared to the related art, and it is possible to avoid failure of opening/closing processing of the specimen containers 200A, 200B as compared to the related art.

In particular, since the lower end surface of the second supports 843, 843A, 843B, 843C, 843D, and 843E is inclined, the plugs 202, 205 are rotated in the same direction as the inclination when the second supports 843, 843A, 843B, 843C, 843D, 843E come into contact with the rib 251 of the plugs 202, 205 during lowering of the plug chuck mechanism 804. Therefore, it is possible to prevent the plugs 202, 205 from being inclined, and to securely perform vertical gripping of the plugs 202, 205 as compared to the related art. In addition, it is possible to prevent excessive stress from being applied to the rib 251, the second support 843, and the like, and it is possible to lower the risk of failure of the plug-closing mechanism 800 and the risk of damage to the plugs 202, 205 as compared to the related art. Due to these effects, plug-opening processing and plug-closing processing of the plugs 202, 205 from the specimen containers 200A, 200B can be performed on the transport path of the specimen test automation system 100, stable specimen test can be performed, and a specimen test automation system with high reliability can be provided.

Due to presence of the second supports 843, 843A, 843B, 843C, 843D, 843E whose lower end surface is inclined, in addition to the press-fit plug 202, plug-opening processing and plug-closing processing of the screw plugs 205 can also be performed securely and automatically. In particular, unlike the press-fit plug 202 which requires a dedicated mechanism, since the screw plug 205 can be plug-closed on the specimen conveyance processing unit 120, the throughput of the plug-closing processing can be improved. Therefore, it is possible to provide a specimen test automation system capable of securely performing the plug-closing processing and improving the processing speed.

Since the second plug chuck parts 842, 842A respectively further include the pressing surfaces 844, 844A configured to contact the upper surface of the plugs 202, 205, particularly when performing during plug-closing of the press-fit plug 202, it is possible to press-fit the press-fit plug 202 into the container 201 more securely, and to further stabilize the plug-closing operation.

Further, since at least one second support 843, 843A, 843D is provided at a position displaced to the outer side in the radial direction of the plugs 202, 205 from the center of gravity 841A of the first supports 841, which is equal to the central position of the plugs 202, 205, it is possible to securely interfere with the rib 251 during plug opening or plug closing of the plugs 202, 205, thereby enabling smooth plug-opening and plug-closing operation.

Since the plurality of second supports 843A, 843B are provided radially from the center of gravity 841A of the first supports 841, which is equal to the central position of the plugs 202, 205, similarly, it is possible to increase the number of positions interfering with the rib 251 during plug opening or plug closing of the plugs 202, 205, thereby enabling smooth plug-opening and plug-closing operation.

Since the invention further includes the rotating motor 831 configured to rotate the first support 841, it is possible to rotate the first support 841 which holds the outer peripheral surface of the plugs 202, 205 at the time of opening and closing the plugs 202, 205, and it is possible to perform smoother plug-opening processing and plug-closing processing.

Since all of the lower end surface of the second supports 843A, 843B have the same inclination direction, the plugs 202, 205 can be rotated in the same direction as the inclination when the rib 251 of the plugs 202, 205 comes into contact with the second supports 843A, 843B, and inclination of the plugs 202, 205 can be suppressed. In addition, it is possible to securely prevent excessive stress from being applied to the rib 251, the second support 843, and the like.

Each of the plug-closing processing units 180A, 180B further includes the plug supply mechanism 810 configured to store the plurality of plugs 202, 205, and the plug conveyance mechanism 811 configured to transport the plugs 202, 205 supplied from the plug supply mechanism 810 to the plug-closing mechanism 800. Therefore, it is possible to perform smooth plug-closing processing during the plug-closing processing in the plug-closing processing units 180A, 180B, and it is possible to improve the processing speed.

The invention further includes the plurality of plug-closing processing units 180A, 180B in accordance with the type of the specimen containers 200A, 200B. The control computer 101 switches and conveys the specimen containers 200A, 200B to the appropriate plug-closing processing unit 180A, 180B in accordance with the type of the specimen containers 200A, 200B. Therefore, when using both the press-fitting plug 202 and the screw plug 205 for the sake of the convenience of the user of the system and test of the specimen, it is possible to perform the plug-closing processing in the same system without reducing the throughput of the entire system, and it is possible to improve the processing speed.

Since the invention further includes the analysis processing unit 190 configured to perform qualitative and quantitative analysis of the specimen, it is possible to complete the processes until analysis inside the system, and thus it is possible to shorten the time until completion of analysis.

<Other Embodiments>

The invention is not limited to the above embodiment, and various modifications and applications can be made thereto. For example, the above-described embodiment has been described in detail in order to make the invention easy to understand, and the invention is not necessarily limited to those which have all the configurations described.

For example, although a case in which the plug processing device is applied to the plug-closing processing units 180A, 180B has been described in the above embodiment, the invention can also be applied to the plug-opening processing unit 150 configured to perform plug opening of the plugs 202, 205 from the specimen containers 200A, 200B, or a plug opening/closing processing unit configured to perform both plug opening and plug closing of the plugs 202, 205 from the specimen containers 200A, 200B.

As described in the above embodiments, the specimen test automation system 100 is described as a system for analyzing a specimen such as a specimen with the analysis processing unit 190 corresponding to an automatic analyzer, and is described as including a preprocessing device configured to perform various preprocessing such as centrifugation, specimen dispensing, plug opening, plug closing, child specimen container generation, barcode label attachment, and the like. However, at least as a system, the specimen test automation system 100 may be only a preprocessing system including a plug-opening mechanism, a plug-closing mechanism, a dispensation mechanism, and a conveyance mechanism configured to convey a specimen between them. Alternatively, the specimen test automation system 100 may be only a post-processing system, a system in which a post-processing system and an analysis system are integrated, or a system in which a preprocessing system, a post-processing system, and an analysis system are integrated.

REFERENCE SIGN LIST

100 Specimen test automation system
101 Control computer
110 Specimen feeding unit
120 Specimen conveyance processing unit
121 Specimen recognition unit
122 Plug detection unit
125, 135, 175, 185A, 185B Carrier recognition unit
130 Specimen storage unit
140 Centrifugation processing unit (processing unit)
150 Plug-opening processing unit
160 Child specimen container generation processing unit
170 Dispensation processing unit (processing unit)
180A, 180B Plug-closing processing unit (plug processing unit)
190 Analysis processing unit
191 Specimen dispensation mechanism
192 Reagent dispensation mechanism
193 Reagent disk
194 Reaction disk
195 Detection mechanism
196 Conveyor line
200A, 200B Specimen container
201 Vessel (for press-fit plug)
202 Plug (press-fit plug)
203 Barcode
204 Vessel (child specimen container) (for screw plug)
205 Plug (screw plug)
210 Carrier
250 Recess
251 Rib
252 Groove
800 Plug-closing mechanism
801 Plug movement mechanism
802 Plug-closing raising/lowering mechanism
803 Plug chuck rotation mechanism
804 Plug chuck mechanism
805 Specimen container clamping mechanism
810 Plug supply mechanism
811 Plug conveyance mechanism (actuator)
831 Rotating motor (rotation mechanism)
832 Ammeter
833 Encoder
834 Torque command signal
835 Command signal of rotation speed
837 Sliding clutch
838 Force sensor
840 First plug chuck part
841 First support
841A Center of gravity
842, 842A, 842B, 842C, 842D Second plug chuck part
843, 843A, 843B, 843C, 843D, 843E Second support
844, 844A Pressing surface

The invention claimed is:

1. A plug processing device comprising:
a first plug chuck configured to grip a plug; and
a second plug chuck positioned above the first plug chuck,
wherein the first plug chuck includes at least two or more first supports configured to grip the plug from a plurality of directions,
the second plug chuck includes a second support arranged in a radial direction of the plug, the second support having an inclined lower end surface that includes a first incline in a radial direction of the second plug chuck and a second incline different from the first incline in a direction perpendicular to the first incline, and
the second plug chuck is rotated and the second support contacts the plug while the plug is supported by the first supports of the first plug chuck, so as to perform plug opening or plug closing of the plug with respect to a container.

2. The plug processing device according to claim 1,
wherein the second plug chuck further includes a pressing surface configured to contact an upper surface of the plug.

3. The plug processing device according to claim 1,
wherein the second supports is provided at a position displaced to an outer side in a radial direction of the plug from a central position of the plug.

4. The plug processing device according to claim 1,
wherein the second support includes a plurality of second supports provided radially from a central position of the plug.

5. The plug processing device according to claim 1, further comprising:
a rotation mechanism configured to rotate the first supports of the first plug chuck.

6. The plug processing device according to claim 4,
wherein all of the lower end surfaces of the plurality of second supports have the same inclination direction.

7. A specimen test automation system comprising:
a plug opening/closing unit configured to perform plug opening and plug closing of a plug from a specimen container sealed by the plug;
a processing unit configured to process a specimen contained in the specimen container;
a conveyor line configured to convey the specimen container to each of the units; and
a control unit configured to control the plug opening/closing unit and the processing unit,
wherein the plug opening/closing unit is the plug processing device according to claim 1.

8. The specimen test automation system according to claim 7,
wherein the plug opening/closing unit includes a plug supply mechanism configured to store a plurality of plugs, and an actuator configured to transport the plug supplied from the plug supply mechanism to the plug opening/closing unit.

9. The specimen test automation system according to claim 7, comprising:
a plurality of the plug opening/closing units in accordance with the specimen container,
wherein the control unit is configured to switch and convey the specimen container to a suitable one of the plug opening/closing units in accordance with the specimen container.

10. The specimen test automation system according to claim 7, further comprising:
an analysis processing unit configured to perform qualitative and quantitative analysis of the specimen.

* * * * *